L. R. KEOGH.
METHOD OF MAKING FUSIBLE COMPOUNDS OF ALUMINIUM AND RECOVERING ALUMINIUM THEREFROM.
APPLICATION FILED AUG. 22, 1908.
996,094.
Patented June 27, 1911.
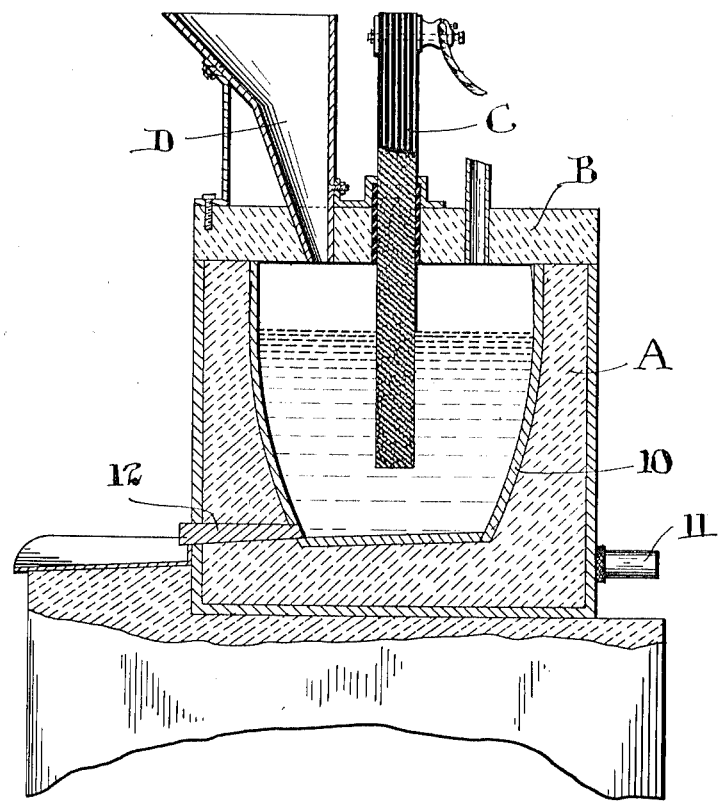
WITNESSES
INVENTOR
L. R. KEOGH
BY
ATT'Y.

UNITED STATES PATENT OFFICE.

LUCIUS RICHARD KEOGH, OF OTTAWA, ONTARIO, CANADA, ASSIGNOR OF ONE-HALF TO CLIFTON ASHTON DOUGLAS, OF OTTAWA, CANADA.

METHOD OF MAKING FUSIBLE COMPOUNDS OF ALUMINIUM AND RECOVERING ALUMINIUM THEREFROM.

996,094.

Specification of Letters Patent. Patented June 27, 1911.

Application filed August 22, 1908. Serial No. 449,835.

*To all whom it may concern:*

Be it known that I, LUCIUS RICHARD KEOGH, of the city of Ottawa, Province of Ontario, Canada, have invented certain new and useful Improvements in Methods of Making Fusible Compounds of Aluminium and Recovering Aluminium Therefrom, and do hereby declare that the following is a full, clear, and exact description of the invention, such as will enable others skilled in the art to which it appertains to make and use the same.

The object of the invention is to provide a simple, cheap and practical method of making fusible aluminium compounds, such as aluminium sulfid, or aluminium double sulfid, for reduction to metallic aluminium, and for economically effecting the said reduction.

In the manufacturing of aluminium, a difficulty is found in cheaply procuring a compound of aluminium from which it may be readily recovered by the reducing action of the electric current, at low voltage. Oxid of aluminium suitable for reduction is easily obtained but its reduction requires a large expenditure of energy. For electric reduction it is necessary that the electrolyte be in fused condition. The sulfid or double sulfid of aluminium and another metal will serve, but they do not occur in nature and have hitherto been difficult to prepare.

The present process provides a simple and economical method of producing these, as well as other compounds, of aluminium, such as aluminium chlorid or double chlorid of aluminium and potassium, or sodium. In addition to this, it provides a means of utilizing the heat used to produce or created by the reaction producing the compound to assist in the recovery of the metallic aluminium by maintaining the electrolyte in fused condition.

The process consists essentially in causing a reaction between a mass composed of the sulfid or chlorid, fluorid, bromid or iodid of sodium, potassium or lithium or other alkaline metal, or a haloid salt, or a sulfid of an alkaline earth metal, as calcium, barium strontium or magnesium; or a mixture or compound of two or more of these compound substances; and a quantity of anhydrous sulfate of aluminium, with or without carbonaceous matter, the mixture preferably being in the form of a fused bath from which the metallic aluminium may, if desired, be afterward recovered by reduction, while the bath is still molten.

The drawing illustrates a form of apparatus in which the operation may be carried out.

In the drawings, A represents a suitable crucible of graphite or carbon having a suitable lining 10 of hard baked carbon.

B represents the cover which may be formed of carbon through which the positive electrode C extends, the crucible itself forming the negative electrode and having a current conductor connected to a suitable connecting post 11 thereon.

The material may be fed into the crucible through a hopper D and drawn off through a tap hole 12.

In carrying out the process, the said mass of haloid salt, or sulfid, or equivalent mixture, is preferably fused in a crucible or melting pot, and a mixture of anhydrous sulfate of alumina and carbonaceous material is gradually added from above, in the form of a dry powder. The said mass is fused by heat applied externally or developed internally, as by electricity, meeting with resistance in the mass. The fusible aluminium compound produced may, while in molten state, be further reduced to metallic aluminium.

If sodium chlorid be used as a bath, the reactions are as follows:

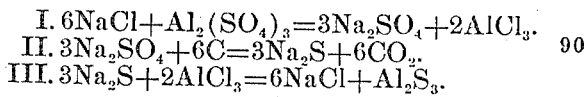

I. $6NaCl + Al_2(SO_4)_3 = 3Na_2SO_4 + 2AlCl_3$.
II. $3Na_2SO_4 + 6C = 3Na_2S + 6CO_2$.
III. $3Na_2S + 2AlCl_3 = 6NaCl + Al_2S_3$.

The aluminium sulfid is formed in a fused or dissolved state, and the sodium chlorid is regenerated, making the process continuous. The reaction develops considerable heat and this, with the formation of chlorid or double chlorid of aluminium, which renders the bath more fusible, effects a considerable saving of energy, required to maintain fusion. It is altogether likely that in this case, the double haloid salt of aluminium and alkaline metal employed is formed and again broken down, for the alkaline haloid is in excess, and though the temperature is much above the point of volatilization of aluminium chlorid, yet no fumes are observed till a marked red heat is attained. On the other hand, the $AlCl_3$ is converted into $Al_2S_3$, as rapidly as it is formed, and this may account for the absence of fumes of $AlCl_3$. The fused mass is ready for immediate reduction by the electric current, thus saving the cost of remelting, and the reduction may go on continuously and simultaneously with the formation of the fusible compounds of aluminium in the bath.

It may be observed that the haloid salt, sulfate and sulfid of the alkaline or alkaline earth metal employed and of the aluminium, are all present in the bath, which consequently, may be spoken of as containing a mixture of compounds of metals, and this will explain the phrase as used hereinafter in the claims.

While the process as a whole results in the production of aluminium, yet it will be seen that the various stages thereof in reality form subordinate integers of the invention which might be separately carried out, resulting in each case in the production of the elements indicated on the right hand side of the equation, the elements on the left hand side of the equation being produced in any suitable manner.

It will be observed that the fusible compound of the metal is in a reduced state and is in a quantity chemically equivalent to the sulfate of aluminium whereby the products produced will be free from oxygen. Analogous reactions to the above occur with other alkaline haloid salts, chlorid of potassium, chlorid of lithium, fluorid of sodium, fluorid of potassium, fluorid of lithium, and the bromids and iodids of sodium, potassium, and lithium; and any of these or mixtures of two or more of them or compounds thereof, may be used, instead of sodium chlorid as above shown. Similar reactions to the above, occur also with the sulfids, above-named, if used in whole or in part, e. g. with sodium sulfid, the reactions are

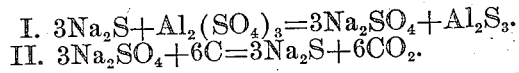

I. $3Na_2S + Al_2(SO_4)_3 = 3Na_2SO_4 + Al_2S_3$.
II. $3Na_2SO_4 + 6C = 3Na_2S + 6CO_2$.

The aluminium sulfid is formed in fused or dissolved condition, and the sulfid of sodium is regenerated, making the reaction continuous. By a further action, double sulfids of aluminium with the other metals employed, may be formed in this case, and polysulfids may be formed to a greater or less extent. To facilitate the solution or fusion of the more infusible double sulfids, the presence of haloid salts of alkalis or alkaline earths is an advantage and the proportion of carbon present in the mass must not be allowed to become too high, and it is recommended that the melting pot be free from silicon.

The above described reaction will take place at about 800 to 900 degrees centigrade, and the only condition to be observed with respect to the temperature is that it should be sufficient to melt the various elements which are to be combined, but not sufficient to volatilize them.

In carrying out the process in its alternative forms it may be found possible to produce the combination of the elements by heating short of melting point and without fusion and in such cases the temperature will naturally be much lower than that above mentioned.

The process can be varied by using the anhydrous sulfate of aluminium, without carbonaceous material, and any of the haloid salts of the alkalis or alkaline earths above mentioned or mixtures or compounds of two or more of these. In this case, the action stops with the formation of the chlorid or analogous salt of aluminium or with the formation of double chlorids of aluminium, or analogous salts, and these, if volatile, may be distilled away and collected. In this way, chlorid or double chlorids of aluminium or analogous compounds may be prepared. Another variation may be adopted when a volatile haloid salt, such as chlorid of sodium, is used to prepare the sulfid or double sulfid of aluminium, which are not volatile. On completion of the reaction as shown above, the volatile haloid salt may be expelled by prolonged heating, and the sulfid or double sulfid of aluminium may be recovered in this way. However, for the preparation of sulfid or double sulfid, of aluminium, for ultimate reduction to metallic aluminium, I prefer to add carbonaceous material, with the anhydrous aluminium sulfate, to the other ingredients employed. This may be conveniently carried out in practice, as follows:—The normal sulfate of aluminium is dried or gently calcined so as to expel the combined water, but not the sulfuric acid, thus:

$Al_2(SO_4)_3.16H_2O = Al_2(SO_4)_3 + 16H_2O$.

The dried sulfate is mixed with carbonaceous material, such as ground charcoal, in equivalent proportions, being by weight 72 parts of available carbon to 341 parts of anhydrous sulfate of alumina. The whole is intimately mixed, finely ground and thoroughly incorporated, with a small quantity of water, to a thick paste, which is thoroughly dried, and finely pulverized. It is introduced dry as possible, into the fused bath of the selected reagent. Care is requisite at this point, as the presence of moisture may cause violent explosions. The pulverized carbonaceous mixture is introduced gradually and steadily at the top of the melting pot, and only as fast as it is taken up by the bath. The carbon dioxid and other gases evolved are allowed to pass off at the top. The bath used in this step may be composed of sulfid, chlorid, fluorid, bromid or iodid of alkaline metals, or a mixture or compound of two or more such substances with or without haloid salt or double haloid salt of aluminium, or it may be a haloid salt of magnesium, calcium, barium or strontium; or a mixture of any two or more of these; or mixtures of haloid salt or sulfids of alkaline metals, or of haloid salts of aluminium or of double haloid salts of aluminium with haloid salts or sulfids of alkaline earth metals may be employed. Sulfates may also be employed as shown previously. In any such case, I obtain a fused mass containing aluminium sulfid or double sulfid or both, and in which aluminium sulfid or double sulfid, is the most easily decomposed electrolyte and this is the end in view. It is essential in case of reduction of this aluminium sulfid or double sulfid to metallic aluminium, that the specific gravity of the bath be less than that of the metallic aluminium, in order that the metallic aluminium may pass to the bottom out of contact with the air, and for this purpose, the proportion of salts of alkaline earths must not be so high as to render the bath of a specific gravity, when molten equal to or more than that of molten aluminium, which is about 2.54 times that of water.

The presence of fluorids in the bath assists in obtaining ready solution and complete fluidity of the mass, while salts of lithium decrease its specific gravity, and certain of the haloid salts such as bromid, iodid, chlorid or double chlorid of aluminium, lower the melting point of the mass. This mass, which may, as above shown, have various compositions, is now ready to be reduced by the electric current. It may be fused and kept in fusion either by heat applied externally to the crucible or by heat developed in the melting chamber. If the composition of the bath is correct and the melting pot properly protected, very little heat will be required to maintain fusion beyond that developed by the reactions taking place. The reduction of the aluminium sulfid or double sulfid may be accomplished by the action of an electric current.

By regulating the voltage of the current, so as to overcome the resistance of the circuit, and to just dissociate the aluminium sulfid, no other metal need be deposited, and aluminium can be obtained free from any appreciable quantity of the other metals present in combination. About .9 volts are required for dissociation of aluminium sulfid; to this must be added the voltage required to overcome other factors of resistance in the circuit. If the reduction to metallic aluminium is conducted in the same melting pot, as that in which the fusible compound of aluminium is produced, it is necessary that it be lined with carbon or with some substance which will not be attacked by the bath or by the reduced aluminium formed.

In addition to the various modifications of the process, which I have above mentioned, the following may be employed: The various combinations of substances above mentioned as being used to form the fusible compounds of aluminium may be mixed together dry and in powdered form, and, on heating, the reactions will occur as above indicated when the proper temperatures are reached, and these actions are facilitated by presence of a fused medium; but such methods are not essentially different from the method of using fused materials, as above described; and they are by me understood and intended to be included in these, my specification and claims.

It will be observed that all the compounds of metals hereinbefore mentioned as being useful in the present process are those of metals more electro-positive than aluminium, and it is this physical characteristic which is used hereinafter in the claims to distinguish the compounds used from those of the rarer metals such as gold, silver, zinc and the like.

In case it is desired to reduce the sulfid or double sulfid of aluminium to metallic aluminium in the same bath in which it is formed, it is necessary that no excess of sulfates be present, as these oxidize the reduced aluminium and prevent its deposition while at the same time, alumina is formed in the bath. It will be observed that the sulfate formed in the reaction is at once reduced by the carbon to a sulfid.

What I claim as my invention is:—

1. In the production of aluminium, the herein described improvement which comprises adding anhydrous sulfate of aluminium and carbonaceous material to a compound of a metal more electro-positive than aluminium, and heating the mixture sufficiently to cause reaction to take place.

2. A process of recovering aluminium which comprises first producing a fusible aluminium compound by adding anhydrous sulfate of aluminium and carbonaceous material to a bath containing a fused compound, of a metal more electro-positive than aluminium, the specific gravity of the bath being less than that of metallic aluminium, and then reducing the fused aluminium sulfid while in said bath.

3. In the production of aluminium, the herein described improvement which comprises adding anhydrous sulfate of aluminium together to carbonaceous material with a compound containing a sulfid of a metal more electro-positive than aluminium, and heating the mixture sufficiently to cause reaction to take place.

4. In the production of aluminium, the herein described improvement which comprises mixing anhydrous sulfate of aluminium and a carbonaceous material with a chemically equivalent quantity of a deoxidized compound of a metal more electropositive than aluminium, and passing an electric current through the mass to effect reduction and the production of a fusible aluminium compound.

5. In the production of aluminium, the herein described improvement which comprises adding anhydrous sulfate of aluminium to a molten bath containing a deoxidized compound of a metal more electropositive than aluminium.

In witness whereof I have hereunto set my hand in the presence of two witnesses.

LUCIUS RICHARD KEOGH.

Witnesses:
RUSSELL L. SMART,
M. GILBERTSON.